United States Patent [19]
Sellman

[11] 3,988,072
[45] Oct. 26, 1976

[54] WIND MOTORS

[76] Inventor: Donald L. Sellman, 407 S. 3rd St., Lincoln, Kans. 67455

[22] Filed: June 28, 1974

[21] Appl. No.: 484,148

[52] U.S. Cl. ................................................. 415/3
[51] Int. Cl.² ........................................ F03D 5/04
[58] Field of Search ............................... 415/2, 3, 4

[56] References Cited
UNITED STATES PATENTS

| 648,442 | 5/1900 | Scott | 415/4 |
|---|---|---|---|
| 705,922 | 7/1902 | Gran | 415/2 |
| 1,234,405 | 7/1917 | Solomon | 415/4 |
| 1,531,964 | 3/1925 | McHenry | 415/4 |
| 1,534,799 | 4/1925 | Maine | 415/2 |
| 1,646,723 | 10/1927 | Bonetto | 415/4 |
| 1,783,669 | 12/1930 | Oliver | 415/2 |

FOREIGN PATENTS OR APPLICATIONS

| 106,614 | 7/1923 | Switzerland | 415/2 |
|---|---|---|---|

*Primary Examiner*—C. J. Husar

[57] ABSTRACT

Wind motors which are propelled by the impact of the wind against the vanes of an impeller wheel, that have wind channeling devices that gather the wind from a large area and funnel it at increased density and pressure to apply multiplied impact against the impeller vanes.

4 Claims, 6 Drawing Figures

WIND MOTORS

BACKGROUND OF THE INVENTION

I. Field of Invention

1. Using the impact of the wind against an impeller wheel to provide mechanical or electric power.

II. Description of the Prior Art

1. There are two broad classes in the prior art. One class are those in which the impeller revolves at right angle to the direction of the wind and has vanes set at an angle on the impeller wheel that provides the wheel turning impulse by the reaction provided by the blades in deflecting the on-coming wind. Hundreds of thousands of this type have been made but very few developed more than one horsepower, in fact a five horse power wind motor of this type is called a large wind motor.

2. The other class are those that revolve in the same direction as the on-coming wind and resemble paddle wheels or certain types of water wheels, there are several types of these; one type has one half of the impeller vanes guarded from the action of the wind, for otherwise they will not revolve since the pressure on the two halves will balance; another type of this class uses folding vanes that close on themselves when they come into the counter pressure, also there is the screw vane type used extensively on top of buildings as ventilator motors.

SUMMARY OF THE INVENTION

The eternal winds cover the entire world and provide the most abundant source of power to be obtained for the benefit of mankind.

The material to make my wind motor has been available for hundreds of years, all that was lacking to tap this unlimited source of power was the conception of my practical wind motor, which can be made in very large sizes, has low cost per h.p. construction cost, is safe to operate, and efficient in all winds including mild winds.

The most important part of my invention is the wind gathering channel device, that preferably has a bottom and top side and a side at each end, the front of this wind channel device is spread out to gather a large quantity of the on-coming wind, the sides of this wind channel slope gradually inwardly to the outlet of the channel where the wind is directed against the vanes of the impeller with a multiplied impact.

DESCRIPTION OF THE PREFERRED EMBODIMENTS

Figure 1:
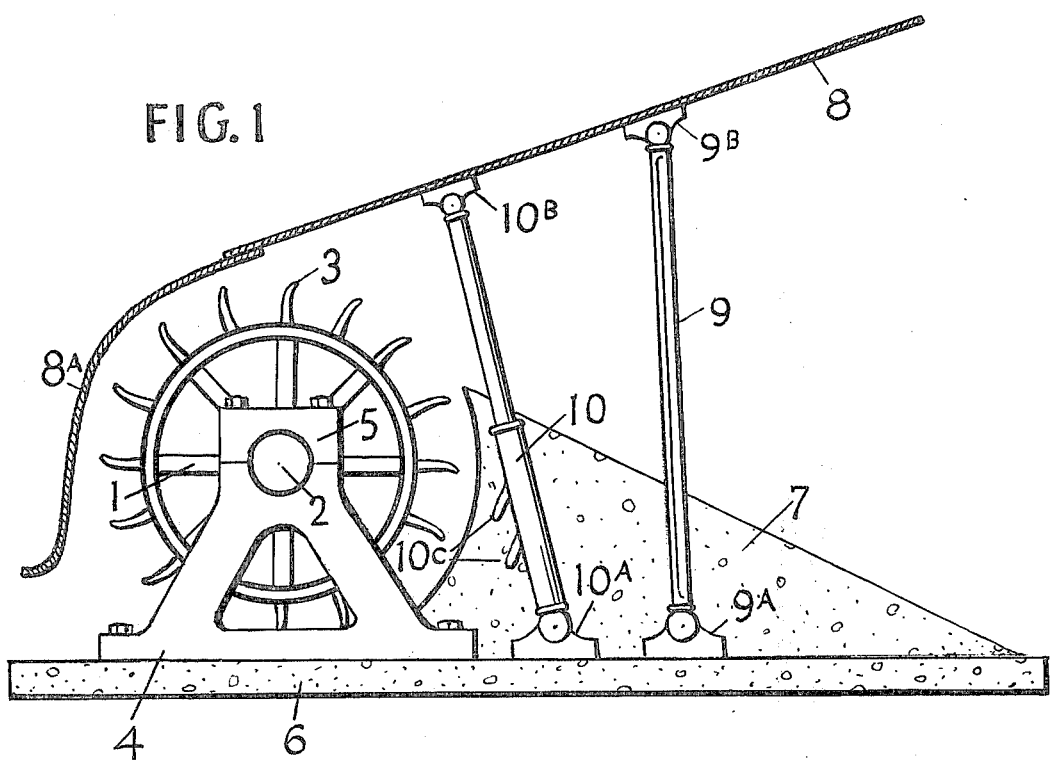
FIG. 1, shows an end view of this wind motor, 1 is the impeller rotor which is mounted on axis shaft 2, 3 denotes the impeller vanes or buckets, shaft 2 is journaled in bearings 5, which bearings are supported by structure No. 4, which structure is mounted on a firm base 6; 7 is an upwardly sloping mound which is preferably hard faced, 8 is the adjustable wind channel member directly above the upwardly sloping mound that gathers, holds, and directs the wind downward toward the impeller vanes, 9 is a supporting bar which is attached to bearing 9A which can be movable or locked into position, the top side bearing of supporting bar 9 is 9B, 10 is a hydraulic cylinder mechanism, 10A is the bottom bearing support for the hydraulic cylinder mechanism and it can be movable or locked into position, 10B is the top side bearing support for the hydraulic mechanism 10, 10C denotes hydraulic hose connections of hydraulic cylinder No. 10, 8 is an extending wind directing cover member which directs the wind down along the path of the impeller vanes.

FIG. 1, version would be satisfactory where the winds blow mostly from the same direction, such as in the arctic and antarctic regions, also in the prevailing trade wind zones, and on top of mountains or at high altitude where the anti-trade winds are found. This version could use the slope of a mountain or hill for wind gathering channel member 7 which could be several thousand feet wide and more than a mile long and rising several thousand feet higher at the top side than at the bottom side.

Also this FIG. 1, version could be made with member 7 not sloping upwardly from the front and having the front top side substantially on the same plane as the rear top of 7. On mountain tops and high plateaus where the wind is strong, only the top wind directing channel member No. 8 would be necessary.

The impeller rotor could be in excess of 1000 ft. in diameter. The top wind channel member 8 could have automatically controlled mechanism to lift up the back side and lower the front side to regulate the wind force striking the impeller vanes and also to divert the wind over the top of the impeller when necessary to protect the impeller from violent destructive winds.

Figure 2:
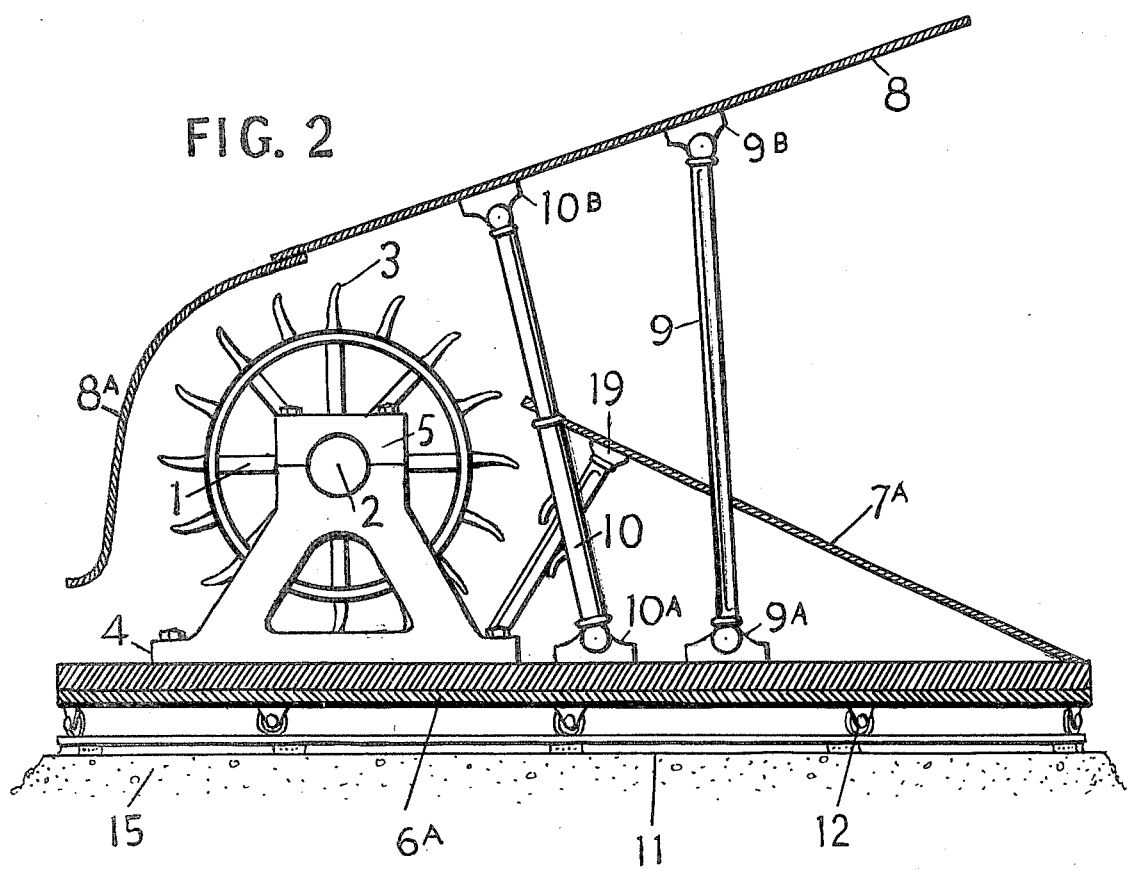
FIG. 2; has some of the same parts as FIG. 1, except the inclined frontal wind channel bottom side member which is denoted by 7A, which movable wind channel member is held in the correct place by adjustable support 19, 6 is preferably a wood or metal platform instead of a stationary base such as in FIG. 1, 15 is a base of some sturdy substance such as concrete which supports the circular path or track 11, wheel assemblies 12 are secured to the bottom side of movable platform 6A and the wheels roll on the circular path or rail 11 so that the wind motor can turn in all directions.

In FIG. 2, version is about the same as in FIG. 1, except it has a variable wind channel slope member 7A and the unit is also mounted on a platform with wheels underneath which are made to run on a circular track or circular hard-surfaced path. This unit could be pointed in any direction and held at any certain place by power driven mechanism.

This version could be made in large sizes such as a series of impeller rotors abreast with multiple stage impeller rotors, extending to or beyond 4,000 ft., with the first stage impeller rotors having a diameter of or in excess of a 1000 ft. The center of the unit could be at the center of a section of land with the outer track, for it would require several circular tracks, forming a circle of nearly a mile in diameter. A unit of this size on a section of land could produce more horse power with a 30 mile per hr. prevailing wind than the hydraulic power plants at Niagara Falls could produce.

Figure 3:
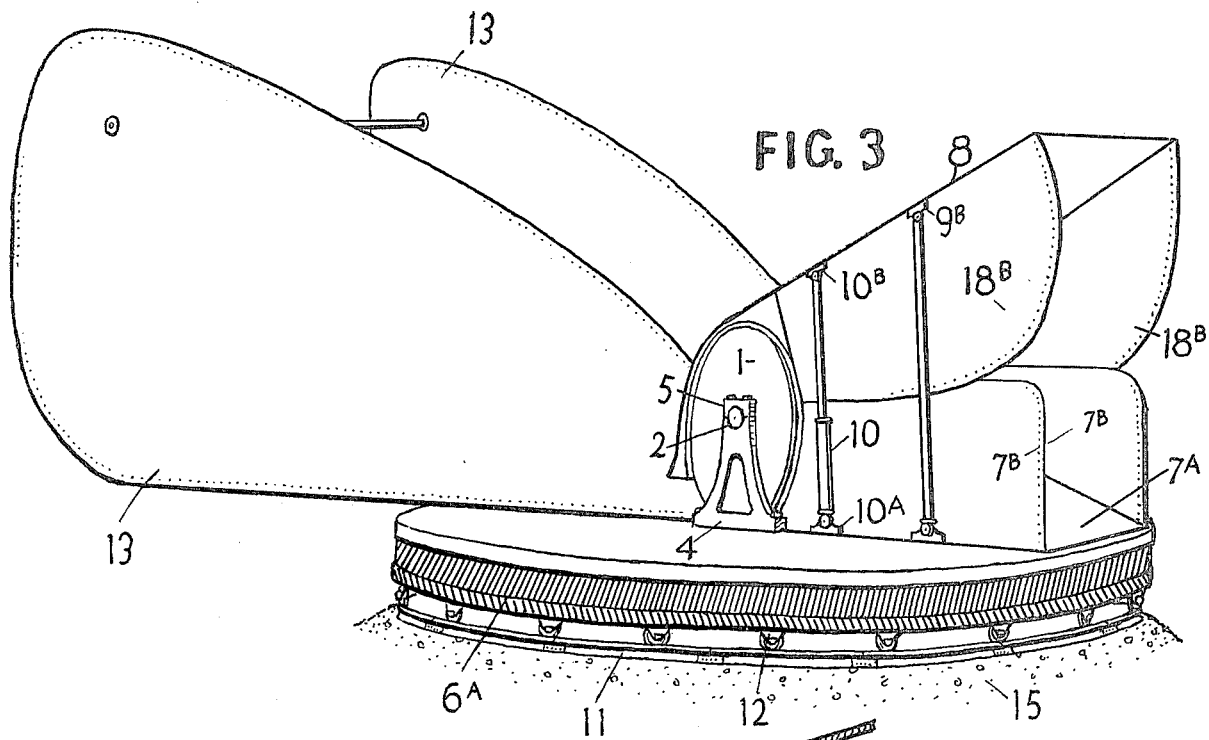
FIG. 3, shows a perspective view of the complete wind motor as in FIG. 2 with the addition of air rudder 13 and wind channel sides 7B of bottom wind channel member 7A, also the wind channel sides 18B of the top side wind channel member 8.

FIG. 3, version with rudder for holding the unit in correct position, is more adaptable for smaller units such as 10,000 H.P. and smaller.

Figure 4:
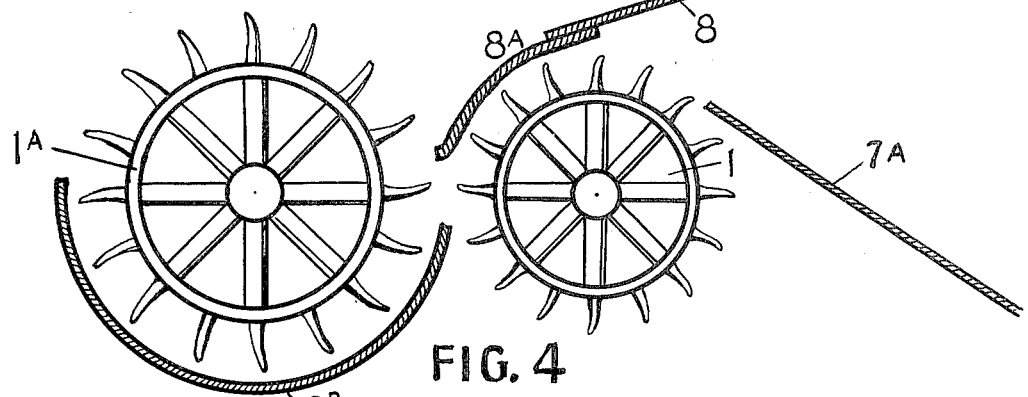
FIG. 4, shows two stages of impeller rotors, No. 1A is the second or low wind pressure member and 8B is the wind directing member at the bottom side of low pressure impeller rotor 1A.

FIG. 4, shows the multiple stage propeller wheels which show the second stage with a larger impeller rotor due to the lower pressure and slower wind which will be received in this stage. Multiple stages will be necessary in big units for maximum efficiency.

Figure 5:
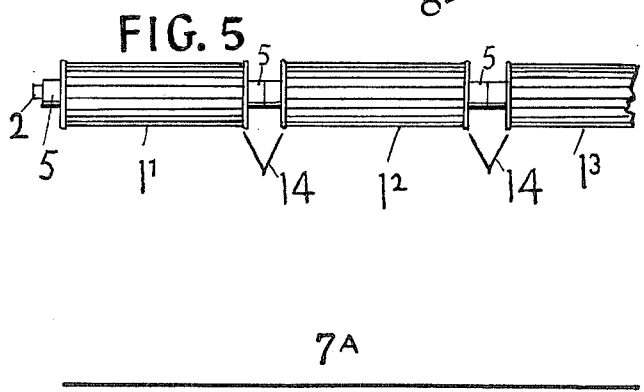
FIG. 5, shows impeller rotors abreast with bearings denoted by 5, deflection members 14 which are mounted preferably on the bottom inclined wind channel member 7A to deflect the on-coming wind to the right or left of the gap where the bearing is located.

FIG. 5, shows the impeller rotors abreast which embodiment would be necessary in very large units. The impeller rotors are shown comparable very small in relation to size of shaft and bearing assembly but actually these impeller rotors would be preferably very large in diameter so as to get the maximum torque from even a slow wind.

Figure 6:
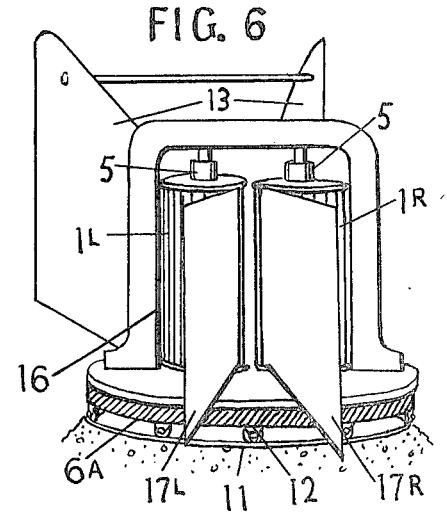
FIG. 6, shows the same wind motor but with vertical parallel abreast impeller rotors represented by 1L and 1R, 16 denotes the structure that supports the impeller shaft bearing 5 of each impeller rotor at the top sides, the base platform supports the bottom side bearings 5 of the impeller rotors, the wind channel main wind directing channel members are the two vertical members 17L and 17R, one impeller rotor could be used instead of two by adjusting the vertical wind channel left and right members at the inner side to direct the wind against the vanes of a single impeller rotor, top and bottom wind channel members which would prevent slip by of the wind are not shown in this drawing but should be included in this type wind motor to increase efficiency especially in the smaller size units.

FIG. 6, embodiment has two parallel and abreast impeller rotors but could have a series of parallel twin rotor units, which two rotors per unit would be more efficient, both from construction cost per h.p. and operating efficiency. This embodiment would be preferable on top of a building, ship, floating platform, mountain top, in fact any place where vertical space is more plentiful than horizontal space.

I claim:
1. A wind motor that is impelled by the impact of the wind against the vanes of an impeller rotor that travels in the same direction as the wind comprising:
   a. a base comprising a substantially flat platform which has a front and rear side;
   b. bearing supports whose bottom sides are attached to the top side of the base platform, the top side of said bearing supports hold the bearings that journal a horizontal axel shaft, which axel shaft has an impeller rotor mounted thereon;
   c. on the perimeter rim of said impeller rotor are arranged cup shaped impeller buckets which face toward the front side of the base platform, these cup shaped buckets are recessed back from the bottom side forming a substantially semi-circle with the top portion reaching towards the front, these cup shaped buckets are closed at each side to prevent side slip-by of the wind;
   d. the impeller rotor is large in diameter so as to have a large circumference with many impeller buckets on its perimeter rim so as to provide maximal torque from a slow wind and also provide a fly wheel stability between intermittent puffs of wind;
   e. a bottom-side wind channel member which is a substantially flat incline plane type platform whose front end is hinged to the front end of the base platform, the rear end of this bottom-side wind channel member is connected to the lift arm of a lift mechanism, this lift mechanism is attached to the top side of the base platform so as to hold this bottom-side wind channel member at the right height to direct the oncoming wind against the impeller buckets;
   f. a top-side substantially flat wind channel member which is located directly above the bottom-side wind channel member and whose length and width measurements are substantially the same as the bottom-side wind channel member, the front end of this top-side wind channel member extends substantially above the top of the impeller rotor and gradually slopes downward so that the back side is substantially at the same height as the impeller rotor, the upper wind channel member is pivoted near the center by structure extending up from the base platform, the lift arm of a lift mechanism is connected to the rear half of the top-side wind channel member, said lift mechanism is attached to the upper side of the base platform so as to hold the upper wind channel member in position to direct the oncoming wind against the impeller buckets;
   g. and the base platform has mounted on its underside wheel supports with wheels so that with the wheels standing on a firm circular roadbed the wind motor can be turned in a circle so as to face the oncoming wind.

2. The combination of claim 1, further providing: an extension wind directing cover member which covers the impeller rotor back side from near the top side to substantially below the height of the axel shaft so as to hold the wind in the buckets for substantially a quarter turn of the impeller rotor.

3. The combination of claim 2, further providing: side wind channel members attached at each side of the bottom and top wind channel members so as to complete the wind channel member by providing structure to prevent side slip-by of the wind.

4. The combination of claim 3, further providing: an air rudder mounted on the rear side of the base platform, and comprising a perpendicular structure which extends rearwardly substantially beyond the back side of the base platform.

* * * * *